United States Patent
Rao Pandu et al.

(10) Patent No.: US 11,892,941 B2
(45) Date of Patent: Feb. 6, 2024

(54) SELF-LEARNING APPLICATION TEST AUTOMATION

(71) Applicant: ACCENTURE GLOBAL SOLUTIONS LIMITED, Dublin (IE)

(72) Inventors: Yogesh Rao Pandu, Bangalore (IN); Shajesh Krishnan Nair, Mumbai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 129 days.

(21) Appl. No.: 17/718,017

(22) Filed: Apr. 11, 2022

(65) Prior Publication Data
US 2023/0325305 A1    Oct. 12, 2023

(51) Int. Cl.
G06F 11/36 (2006.01)
H04N 21/426 (2011.01)
H04N 21/44 (2011.01)

(52) U.S. Cl.
CPC ...... *G06F 11/3684* (2013.01); *G06F 11/3664* (2013.01); *G06F 11/3688* (2013.01); *G06F 11/3692* (2013.01); *H04N 21/42646* (2013.01); *H04N 21/44012* (2013.01)

(58) Field of Classification Search
CPC .......... G06F 11/3692; G06F 11/3688; G06F 11/3684; G06F 11/3664; H04N 21/44012; H04N 21/42646
See application file for complete search history.

(56) References Cited

U.S. PATENT DOCUMENTS 11,023,368 B1    6/2021    Furman et al.
2019/0278700 A1  9/2019    Ranjan et al.

OTHER PUBLICATIONS

Ueno Susumu, JP 2004086355, (translation), Mar. 18, 2004, 18 pgs <JP_2004086355.pdf>.*
Cavalli, Manuele, EP 2789127 B1, (translation) Jul. 26, 2017, 20 pgs <EP_2789127B1.pdf>.*
Zhang Tao, CN 102419732, (translation) Mar. 18, 2015, 15 pgs <CN_102419732.pdf>.*
Li et al., CN 111143205, (translation), May 12, 2020, 12 pgs <CN_111143205.pdf>.*

(Continued)

*Primary Examiner* — Tuan A Vu
(74) *Attorney, Agent, or Firm* — Mannava & Kang, P.C.

(57) ABSTRACT

A self-learning automated application testing system automatically generates test scripts during the execution of an application using an automatic test script generator plugged into the application. The test scripts are generated by capturing event data of events emitted during the execution of the application. The test scripts are compared to the test scripts stored in a test script repository and those test scripts that are determined to be duplicates of the existing test scripts are discarded while the remaining test scripts are stored as new test scripts in the test script repository. An application tester runs regression tests on the application per the new test scripts and logs the results to a test results repository. A dashboard is also provided that enables a user to view and edit the test scripts from the test scripts repository, change configuration settings from a configuration repository, and view test results from the test results repository.

20 Claims, 9 Drawing Sheets

(56) References Cited

OTHER PUBLICATIONS

Rik Marselis et al., "Testing with Self-learning and Selfexploring Testing Tools", Mar. 30, 2017, https://labs.sogeti.com/author; (15 pages).

Mahshid Helali Moghadam et al, "An autonomous performance testing framework using self-adaptivefuzzy reinforcement learning", Mar. 10, 2021, (43 pages) https://link.springer.com/article/10.1007/s11219-020-09532-z.

Nikhil Kejriwal, "Automatic Test Case Generation Using Machine Learning", May 24, 2021, (11 pages).

https://www.functionize.com/machine-learning-in-software-testing; Download Date—Feb. 15, 2022 (15 pages).

\* cited by examiner

SELF-LEARNING APPLICATION TEST AUTOMATION

BACKGROUND

Regression testing is a type of software testing to confirm that a recent program or code change has not adversely affected existing features of a software application. Regression testing may involve a full or partial selection of already executed test cases of an application to ensure that the application remains defect-free at any given point in time. Automating software testing can reduce cost, improve accuracy by reducing human errors, reduce the time taken to run the test cases, etc. However, the creation of regression test cases for an application can be time-consuming, and the situation is exacerbated in the case of legacy applications where minimal or no documentation exists.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
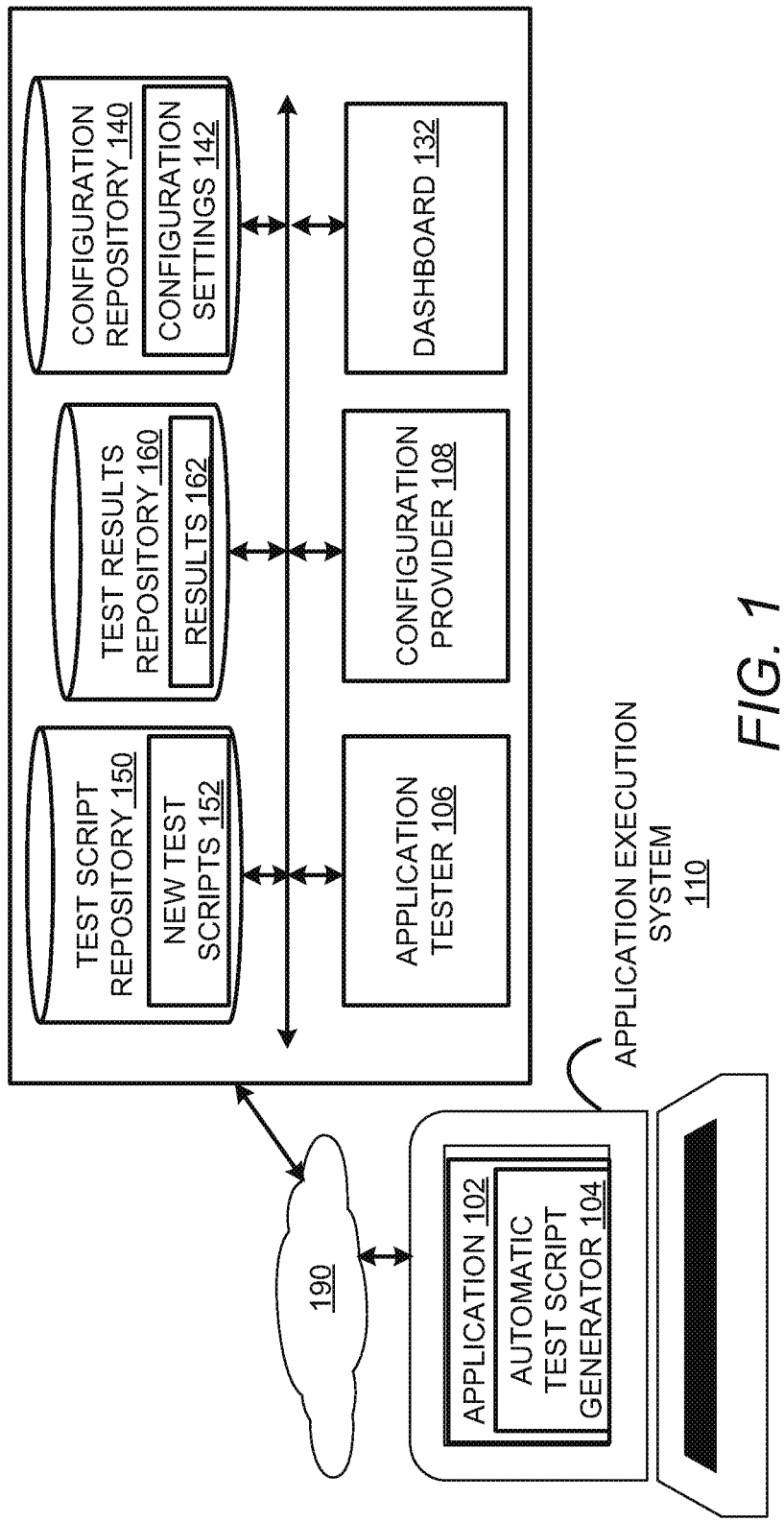
FIG. 1 shows a block diagram of a self-learning automated application testing system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A self-learning automated application testing system that generates test scripts for regression testing of a software application even as the application is being executed is disclosed. An application execution system executes the application, which has an in-built test script generator so that whenever the application is executed, the test script generator is also activated depending on configuration settings. The test script generator records the user interactions with the application and generates the test scripts for the application therefrom. An application tester accesses the automatically generated test scripts and executes regression tests on the application, according to the test scripts. The results of the regression tests are logged to a test results repository and may be accessed by the user via a dashboard.

The test script generator is built into the application in the same programming language/technology platform as the application. When the application is started, the test script generator may be switched on/activated or deactivated depending on the configuration settings of the application. For example, a user may deactivate the test script generation, if so desired during the application execution. The user interactions with the application, including but not limited to, the screens/user interfaces (UIs) accessed by the user, the inputs received from the user, the outputs provided in response to the inputs, etc., are automatically recorded as user interaction data in addition to collecting data related to the expected results per the configuration settings of the test script generator. The test script generator can access configuration parameters and generate the test scripts in a defined format that can include the various attributes and element values necessary for the automatic execution of the corresponding regression tests. The format can also include human-readable attributes and values that may enable the user during the test script to better understand the flow of the test script and edit the test script if necessary. In an example, the test script generator and the application may be executed in different process threads. More particularly, the test script generator is built on the concept of event triggers and event subscribers. Therefore, user actions such as but not limited to, clicking a button, moving focus, etc., are captured as the respective event is triggered. The event subscribers of the test script generator process these events and perform necessary steps to capture the user data from the screens and fields of the application. Such event data capture may happen asynchronously and in parallel so that the main execution of the application remains undisturbed. The test script generator includes appropriate logic/programming code that implements the necessary error handling to ensure that the application does not malfunction or crash during the event data capture.

In an example, the test script generator can be communicatively coupled to a test script repository. The test scripts automatically generated by the test script generator can be compared to previously generated test scripts from the test script repository. In addition to simple text processing like string comparison, artificial intelligence (AI) techniques such as natural language processing (NLP) can be employed to determine if the automatically generated test scripts are similar to any of the previously generated or prior recorded test scripts already stored in the test script repository. If one or more of the automatically generated test scripts are found to be similar to one or more of the already existing test scripts, then such test scripts are discarded. The automatically generated test scripts that are determined to be unique and not already stored in the test script repository are stored as new test scripts in the test script repository thereby ensuring that there are no duplicate or redundant test scripts stored in the test script repository.

The new test scripts are accessed by an application tester for executing the regression tests on the application. In an example, the application tester may initially access the configuration settings from the configuration repository to execute the regression tests based on test configuration parameters. In an example, the test configuration parameters can include but are not limited to, the path to the test script repository, the test execution attributes, the test execution mode (whether parallel or sequential), the test result format, the test results log parameters, etc. In an example, the application tester may host an instance of the application on which the regression tests are executed per the new test scripts. The results from executing the regression tests are stored in the test results repository along with the actual results and the expected results. The results can be reviewed by a user via a dashboard. In an example, the application testing system also includes a configuration repository that stores configuration settings for the test script generator and the application tester. The dashboard can also enable the user to manipulate the configuration settings, according to requirements.

The automated application testing system disclosed herein provides a technical solution to the technical problem of creating regression test scenarios which can have many steps to cover the various possible flows of an application such as a web application. While external automation testing tools may be available, they are not configured to generate test scripts during the normal course of application usage. Rather, such external automation testing tools require separate instances of the applications for the generation of the test scripts from application logs. As a result, these external automation testing applications demand additional computing resources. Furthermore, exiting plugins and script generators can only be used to record user actions and playback the user actions as-is i.e., they do not record the flow of the application under test. Also, the existing testing applications require a tester who is well versed in the domain and the functionality of the application to predetermine/define in advance proper test cases. As the application testers are external to the application under test, the security aspects also need to be addressed when testing the application. The automated application testing system in accordance with the examples disclosed herein has a test script generator built into the application in the same programming language as the application so that the security of the application is not compromised and no additional processing/computing resources are not required for generating test scripts. The test scripts are automatically generated by the application itself during its normal usage. Therefore, any changes/updates to the applications are automatically reflected in the test scripts generated by the in-built test script generator. Furthermore, the test script generator is executed asynchronously in a different process thread than the application and therefore does not affect the performance of the application. Such execution of the application and the test script generator not only mitigates any degradation of user experience with the application during the script generation process but also provides accurate test results for the application performances. Another feature that mitigates degradation of the user experience due to additional test-generation functionality of the application is the configurable aspect of the test script generator wherein a user may provide specific input to disable the test script generation if the user so desires. The automated application testing system improves application test systems by making them faster via automatic test script generation that automatically reflects any application updates without causing any impediments to the user experience with the application.

FIG. 1 shows a block diagram of a self-learning automated application testing system 100 in accordance with the examples disclosed herein. The application testing system 100 is configured to test an application 102 with test scripts that are generated even as the application 102 is executed, for example, on an application execution system 110. In an example, the application execution system 110 may include an application processor and a non-transitory processor-readable medium (not shown) storing machine-readable instructions that cause the application processor to execute the application 102 along with an automatic test script generator 104. For example, the test script generator 104 may be activated based on the values read from the application start-up configuration. e.g., when RuntestscriptGenerator=true. User interactions with the application 102 are recorded and are used to generate test scripts which are later employed for testing the application 102. The application 102 can include without limitation, standalone applications, web applications, or mobile applications. The application testing system 100 can include an automatic test script generator 104, an application tester 106, and a configuration provider 108. The automatic test script generator 104 generates new test scripts 152 during the execution of the application 102 and stores the newly-generated test scripts to test script repository 150. The application tester 106 accesses the new test scripts 152 from the test script repository 150 and tests the application 102 in accordance with the new test scripts 152. The results 162 from the tests can be stored in the test results repository 160. The configuration provider 108 not only enables the display of the test results but also enables the configuration of the application testing system 100 for the generation and execution of the test scripts. In an example, the configuration provider 108 may be communicatively coupled to the configuration repository 140 where application settings are stored not only for the generation of the test scripts but also for the execution of the tests based on such test scripts. In an example, the paths to the configuration repository 140, and the test results repository 160 can be maintained within the configuration information of the application 102 so that the automatic test script generator 104 can read the path data at the runtime. The configuration provider 108 may provide a dashboard 132 for various user interface displays.

In an example, the automatic test script generator 104 may be built into the application 102 and therefore encoded in the same programming language as the application 102. For example, if the application 102 is programmed in Java®, or uses NET® platforms, then the automatic test script generator 104 is also correspondingly programmed in Java® or .NET®. Similarly, if the application 102 is encoded in Angular®, then the automatic test script generator 104 is also included in the application is also encoded in Angular®. Therefore, the automatic test script generator 104 forms a plug-in or a module of the application 102. Furthermore, the application 102 and the automatic test script generator 104 may execute in different process threads when being executed simultaneously so that the performance of the application 102 is not degraded and remains unaffected by the test script generation process. In an example, a user can provide a 'stop script generation' user input that enables halting or aborts the generation of new test scripts. In an example, the 'stop script generation' user input may be provided by the user via a widget on a user interface (UI) of the application 102

The application tester 106 may include a testing processor (not shown) and executes regression tests on the application 102 per the new test scripts 152. Initially, the application tester 106 may access test configuration settings from the configuration repository 140. Based on the configuration settings, the regression tests can be executed sequentially or in parallel. Although the application tester 106 is shown as being executed separately by a different machine from the application 102, it may be appreciated that this is not necessary. In an example, the application tester 106 may be executed on the same machine as application 102 e.g., the application execution system 110.

The configuration provider 108 may include a configuration processor (not shown) and provides the various configuration settings 142 not only for the generation of the test scripts by the automatic test script generator 104 but also for the execution of the tests by the application tester 106. In an example, the configuration provider 108 may include different UIs for enabling the user to set different configuration settings and for viewing the results 162. Furthermore, the configuration provider 108 can enable the user to access, view, and edit the new test scripts 152 created by the automatic test script generator 104. The configuration settings 142 accessed from the configuration repository 140 can include but are not limited to, script generation configuration settings such as the parameters of the automatic test script generator 104, e.g., whether the test scripts are to be generated during the execution of the application 102, the elements on a UI of the application 102 that have to be considered for expected results, etc. The configuration settings 142 can also include the test execution configuration settings to be accessed by the application tester 106. The test execution configuration settings can include but are not limited to the various paths to the test scripts stored in the test script repository 152, inputs regarding executing the tests in parallel or sequentially, etc.

It may be appreciated that the application execution system 110, the application tester 106, and the configuration provider 108 are shown as being hosted on different computers/machines communicatively coupled via a network cloud 190 for illustration purposes only that this is not necessary. As the application 102 has an in-built automatic test script generator 104, the application tester 106 and the configuration provider 108 can also be hosted on the application execution system 110 in accordance with one example.

Figure 2:
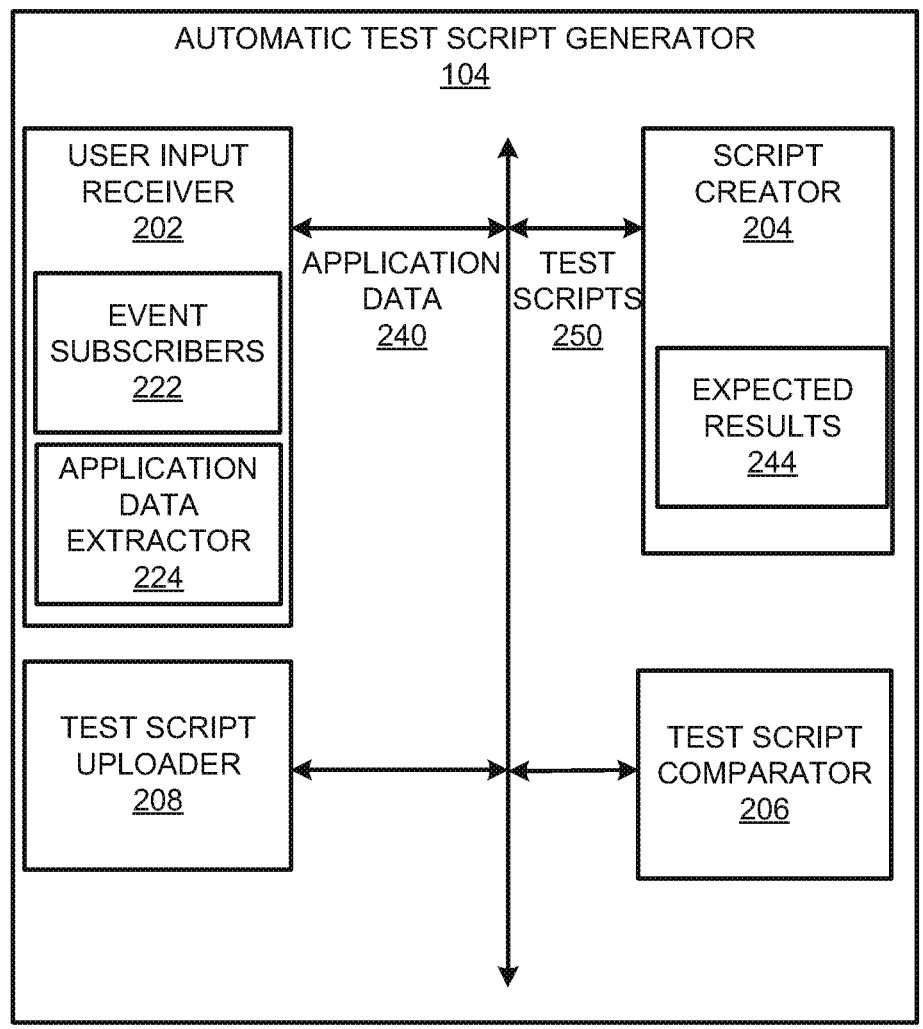
FIG. 2 shows a block diagram of a test script generator in accordance with the examples disclosed herein.

FIG. 2 shows a block diagram of the automatic test script generator 104 in accordance with the examples disclosed herein. The automatic test script generator 104 includes a user input receiver 202, a script creator 204, a test script comparator 206, and a test script uploader 208 in accordance with an example. The automatic test script generator 104 generates new test scripts even as application 102 is executed by the application execution system 110. As the application 102 is being executed, the user may interact with the application 102 in different ways by providing inputs to receive the outputs. For example, if the application 102 is a web application with fields to receive user input and provide outputs, the user may interact with the input fields to obtain the expected output. It may be noted that the user interaction with the application 102, recorded by the user input receiver 202 occurs during the course of application execution and may not be a separate testing session.

The user input receiver 202 accesses such user inputs and records the user interaction flows which may include the sequence in which the user inputs were received and the outputs were provided. The user input receiver 202 may automatically record all screens accessed by the user, data inputs received from or provided to the user and the objects from the application 102. In an example, the user input receiver 202 can include event subscribers 222 and an application data extractor 224. The event subscribers 222 can expose event subscription capability wherein an event subscriber can be configured to capture one of the events that can be triggered from the application 102. Therefore, as many event subscribers can be defined within the user input receiver 202 as the events that may be fired from the application 102. When an event such as a change focus event or a button click event is fired from the application 102, the corresponding one of the event subscribers 222 can capture the event data. The event data thus captured is provided to the application data extractor 224 which extracts information such as the user data which is provided by the user to the application 102 as well as the application flow. For example, if the application 102 is a web application, the application flow may be obtained by accessing or reading the tags and elements on the webpage. In an example, the application flow can include the order in which the various user interface screens were accessed by the user.

Once the user indicates that the interaction with the application 102 is complete, e.g., by clicking a button, the application data 240 extracted during the interaction is provided to the script creator 204 which includes programming code that programmatically generates the test scripts from the application data 240 extracted by the user input receiver 202. More particularly, the data regarding the screens accessed, the data received or provided during the user interactions with the application 102, and the objects used, etc., is combined with the expected results 244 by the test script generator 104 for the creation of test scripts 250. It may be appreciated that the expected results 244 are shown as part of the script creator 204 for illustration purposes only and that the expected results 244 can be accessed from a local memory of a machine (not shown) executing the test script generator 104. In an example, the test scripts 250 can include attributes such as field names, field values, field text, field labels, etc., and the corresponding element values, etc.

The test scripts 250 thus created are provided to the script comparator 206 which is communicatively coupled to the test script repository 150 which stores previously generated test scripts. The test script comparator 206 compares the test scripts 250 with the previously generated test scripts from the test script repository 150. In an example, the test script comparator 206 may treat the test scripts 250 as textual data and employ text processing techniques e.g., string comparisons, etc., for determining if any of the test scripts 250 are already stored in the test script repository 150. It may be noted that although only one application execution system 110 is shown, that may be many instances of the application 102 being executed on computers around the globe, and each instance of the application 102 may include a corresponding test script generator communicatively coupled to the test script repository 150. Therefore, the test scripts 250 are compared to the previous test scripts stored on the test script repository 150 by several instances of the application 102 from around the globe and not just the single instance on the application execution system 110. If one or more of the test scripts 250 are already stored in the test script repository 150, then such test scripts are discarded. The remainder of the test scripts 250 are provided to the test script uploader 208 to be uploaded as the new test scripts 152 to the test script repository 150. In an example, the necessary flags may be set in the test script repository 150 to indicate that the existing script may be obsolete and needs attention, which can help in managing the accuracy of the existing scripts.

Figure 3:
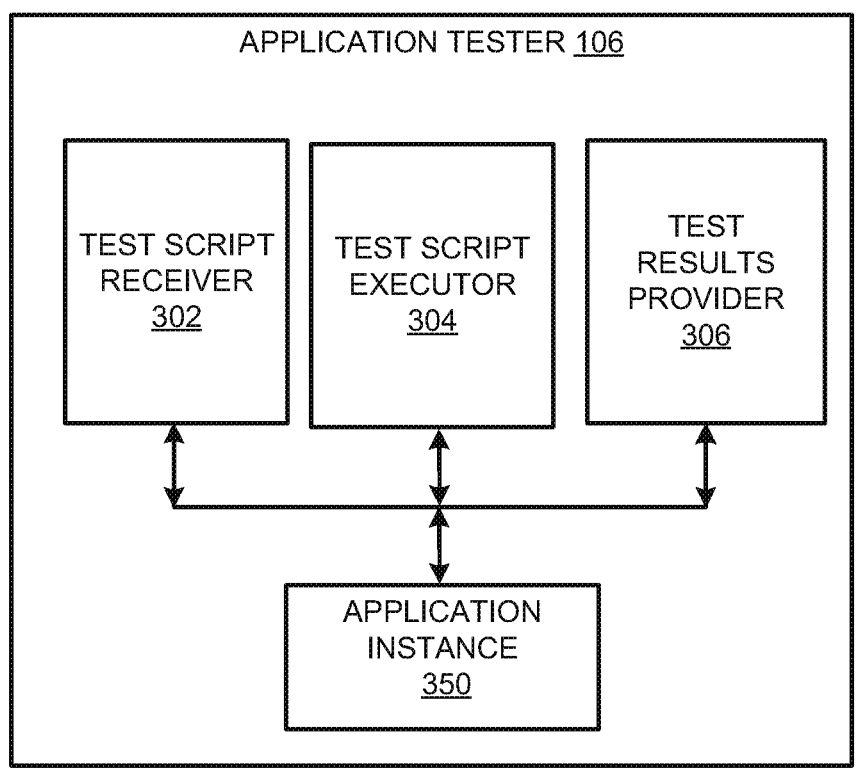
FIG. 3 shows a block diagram of an application tester in accordance with the examples disclosed herein.

FIG. 3 shows a block diagram of the application tester 106 in accordance with the examples disclosed herein. The application tester 106 includes a test script receiver 302, a test script executor 304, and a test result provider 306. In an example where the application tester 106 is hosted on a different machine than the application execution system 110, the application tester 106 may also host an instance 350 of the application 102 wherein the automatic test script generator 104 is deactivated via the configuration settings 142. In an example where the application tester 106 is hosted on the application execution system 110 also, the automatic test script generator 104 may be deactivated after the new test scripts 152 are generated. The test script receiver 302 accesses the new test scripts 152 from the test script repository 150. The test script executor 304 executes regression tests in accordance with the new test scripts 152. The test results provider 306 uploads the results 162 of the regression tests to the test results repository 160. In an example, the results 162 can include the expected results and the actual results of the regression tests. In a case, an expected result does not match the actual result, the failure point is captured as an image, and stored as part of the test results 162 in the test results repository 160. In an example, the application tester 106 can be built using Selenium®.

Figure 4:
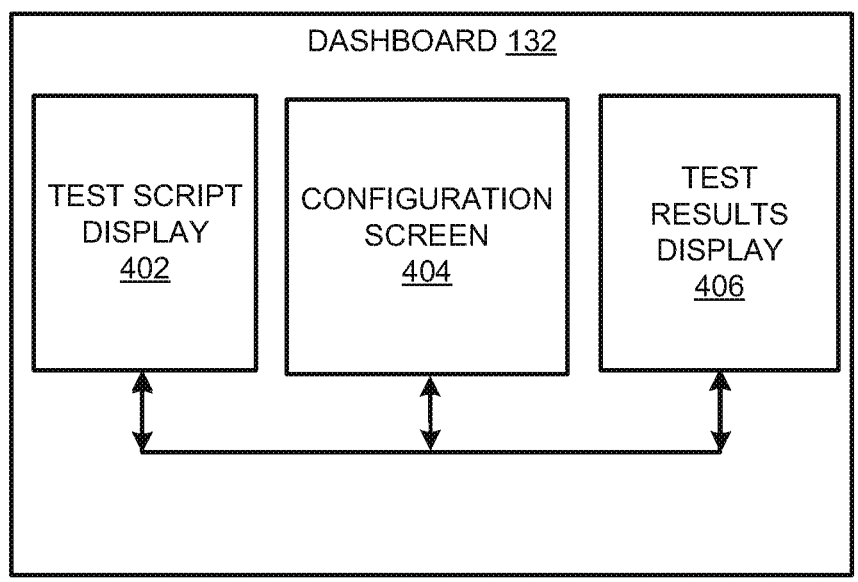
FIG. 4 shows a block diagram of a dashboard in accordance with the examples disclosed herein.

FIG. 4 shows a block diagram of the dashboard 132 in accordance with the examples disclosed herein. The dashboard enables an administrative user of the automated application testing system 100 to view and manage the test scripts, view the results 162 of the regression tests, configured the parameters of the automatic test script generator 104 and the application tester 106, manage and schedule the regression tests by the application tester 106, etc. In addition, the dashboard 132 may provide views of various key performance indicators (KPIs) of the automated application testing system 100, such as but not limited to, defect rate, test execution time, statuses, the performance of the test execution process, etc. In an example, the dashboard 132 may be built using Angular®, .NET®, and MySQL®.

The dashboard 132 can include a test script display 402 that displays the test scripts from the test script repository 150 including the new test scripts 152. In an example, a user may edit the test scripts using the test script to display 402. The dashboard 132 further includes a configuration screen 404 which enables configuring not only the automatic test script generator 104 but also the application tester 106. For example, the configuration screen 404 can enable adjustment of test execution configuration settings such as allowing a user to provide a 'stop script generation' input that disables the automatic test script generator 104 during the execution of the application 102. Similarly, the configuration screen 404 may also enable users to provide inputs for test execution, such as the path of the test script repository 150, input regarding whether the regression tests should be executed sequentially or parallelly, the path to the test results repository 160, etc. The test results display 406 displays the results 162 from the test results repository 160.

Figure 5:
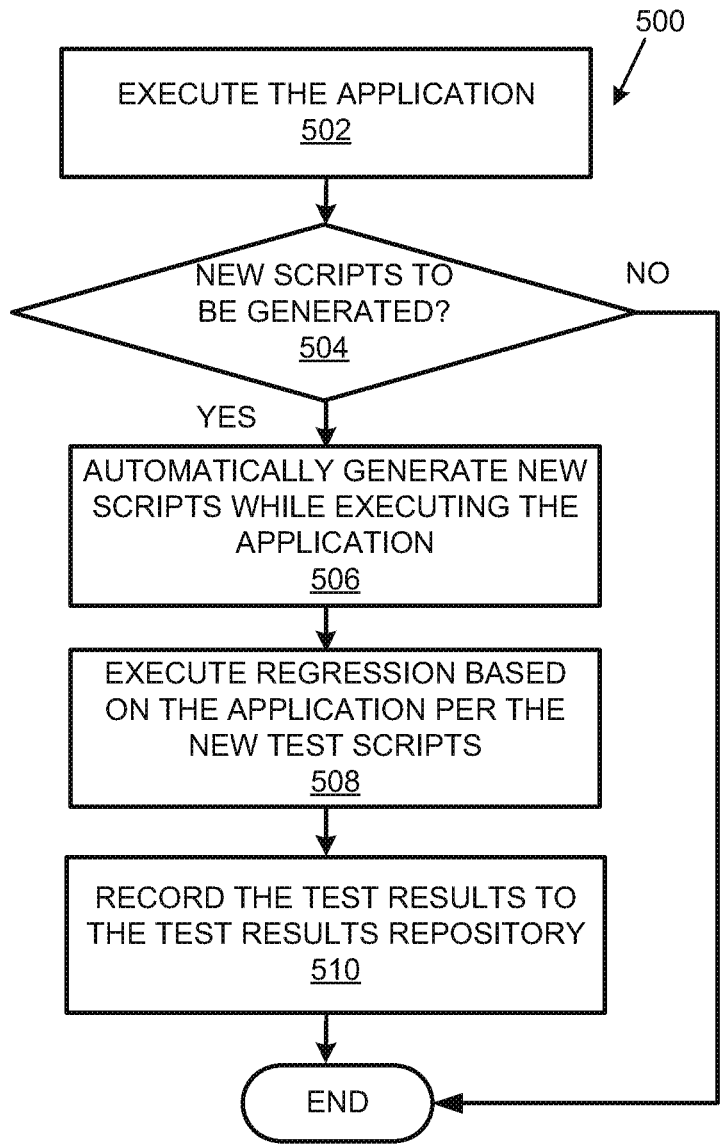
FIG. 5 shows a flowchart that details a method of testing an application in accordance with the examples disclosed herein.

FIG. 5 shows a flowchart 500 that details a method of testing an application in accordance with the examples disclosed herein. The method begins at 502 wherein the application 102 is executed. At 504, it is determined based on the configuration settings 142 if new test scripts are to be generated. As mentioned above, a configuration input can be provided to an instance of the application 102 in order to activate or deactivate the automatic test script generator 104 from producing new test scripts whenever the application 102 is being executed. If it is determined at 504, then no new test scripts are to be generated the method may terminate on the end block. If it is determined at 504 that new test scripts are to be generated the method moves to 506, wherein the new test scripts 152 are automatically generated even as the application 102 is being executed. At 508, regression tests are executed or run on the application 102 per the new test scripts 152. At 510, the results 162 of the regression tests are recorded in the test results repository 160.

Figure 6A:
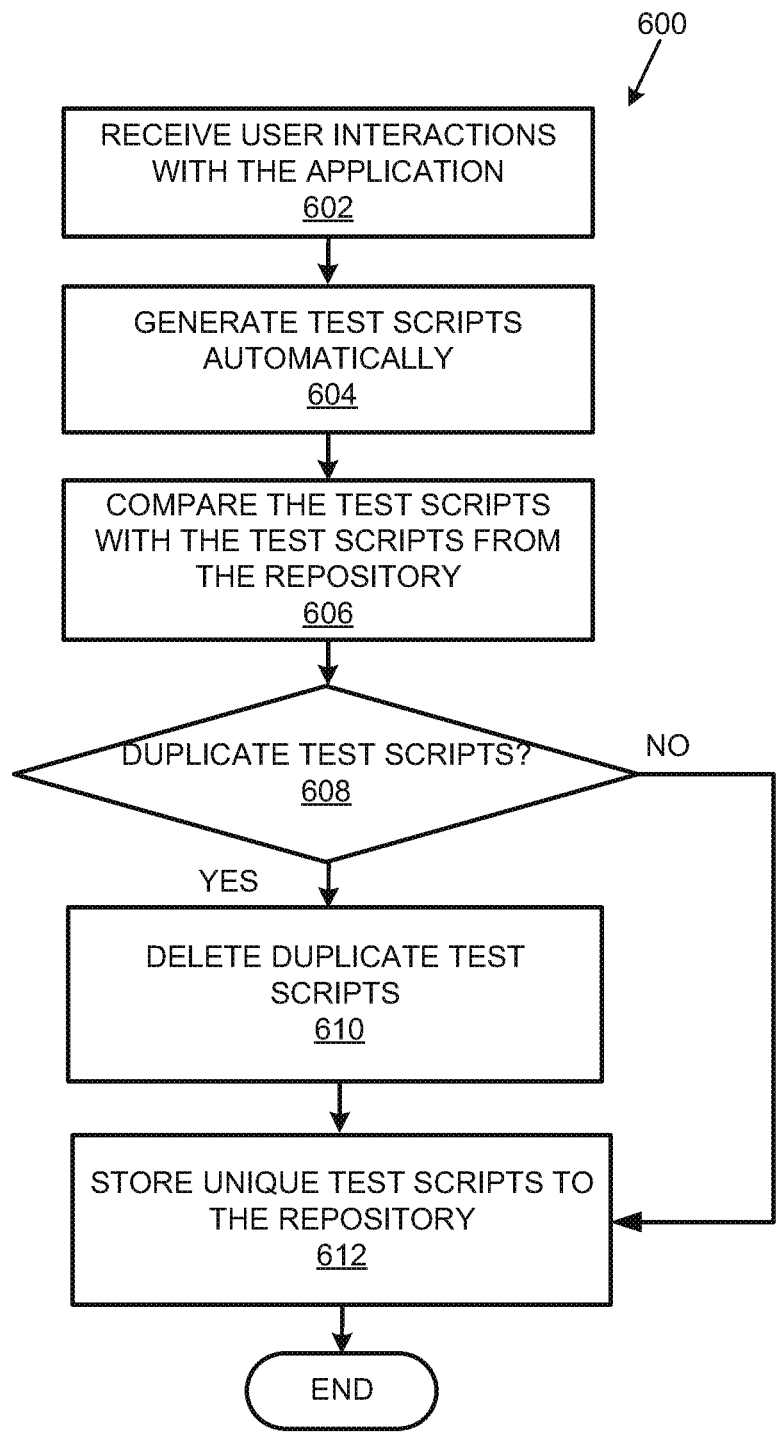
FIG. 6A shows a flowchart that details a method of updating a test script repository in accordance with the examples disclosed herein.

FIG. 6A shows a flowchart 600 that details a method of updating the test script repository 150 in accordance with the examples disclosed herein. The method begins at 602 wherein the user interactions of the application 102 are received. At 604, the test scripts 250 are automatically generated from the user interactions to include the expected results. At 606, the generated test scripts are compared with test scripts stored in the test script repository 150. It is determined at 608 if any of the test scripts 250 are similar or duplicates to the test scripts in the test script repository 150. In an example, NLP techniques, text data processing methods, etc., can be employed to identify similar test scripts at 608. If duplicate test scripts are identified at 608, then such test scripts are deleted at 610 and the unique ones of the test scripts 250 are stored as new test scripts 152 at 612.

Figure 6B:
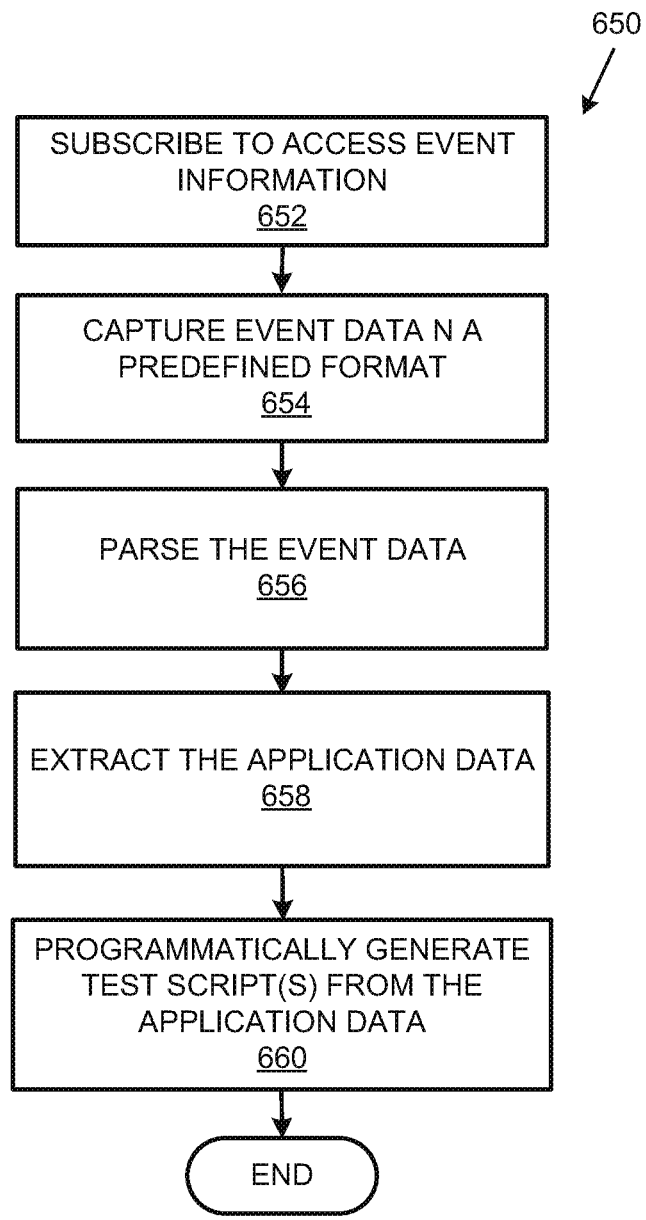
FIG. 6B shows a flowchart that details a method of automatically generating test scripts in accordance with the examples disclosed herein.
Figure 7:
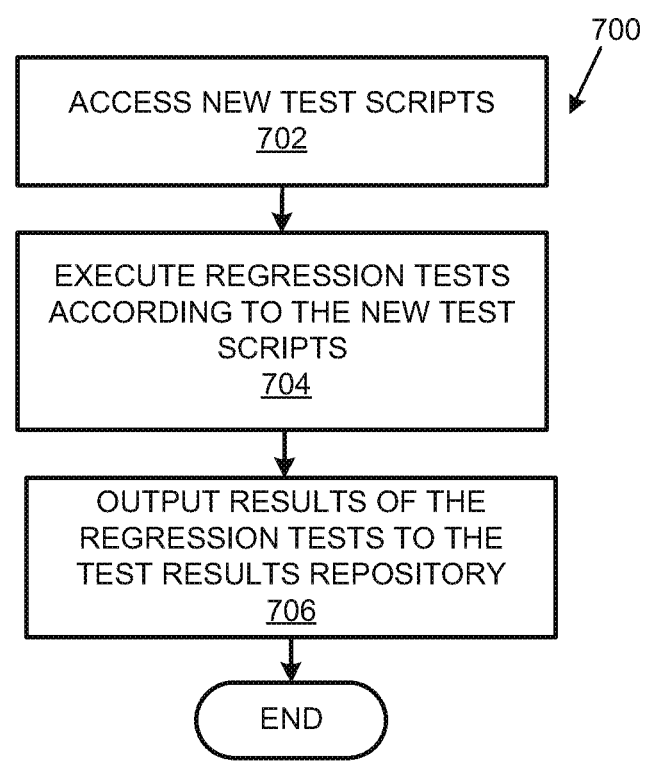
FIG. 7 shows a flowchart that details a method of executing tests based on the automatically generated test scripts in accordance with the examples disclosed herein.

FIG. 6B shows a flowchart 650 that details a method of automatically generating test scripts in accordance with the examples disclosed herein. The method begins at 652 wherein the event subscribers 222 subscribe to access information regarding the events fired by the application 102. At 654 the event data is captured in a predefined format as the user interacts with the application 102. At 656, the event data is parsed and the necessary application data 240 is extracted at 658. In an example, natural language processing (NLP) techniques can be used to extract the application data 240. The application data 240 may not only include the various user interface (UI) elements in the user interactions but also the data supplied by the user and the application flow which may include the sequence in which UI screens were accessed by the user. The application data 240 thus received can be used by the programming code of the script creator 204 to generate a test script file (e.g., a JSON file) at 660. In an example, the test script file can be generated by the script creator 204 which may programmatically include the necessary application data into the programmatically generated script e.g., JSON script. The test script file can be programmatically formatted or defined in such a way that it would be processed by the application tester 106 which may parse the test script file and perform the necessary actions on the application 102, input values, validate the page state, and values. In an example, the expected results can be appended to each test script file at 660. One or more test script files can be generated from a single user interaction session of the application 102 by supplying different possible values to the attributes/parameters in a given test script file. The different possible values to be provided to an attribute can be obtained from the configuration parameters of the test script generation process. FIG. 7 shows a flowchart 700 that details a method of executing tests based on the automatically generated test scripts in accordance with some examples. The method begins at 702 wherein the new test scripts 152 are accessed by the application tester 106. In an example, the application tester 106 may execute an instance of the application for running the new test scripts 152. Accordingly, at 704, the new test scripts 152 are used to execute regression tests on the application instance hosted by the application tester 106. At 706, the results 162 produced by the application tester are logged to the test results repository 160 for user review.

Figure 8:
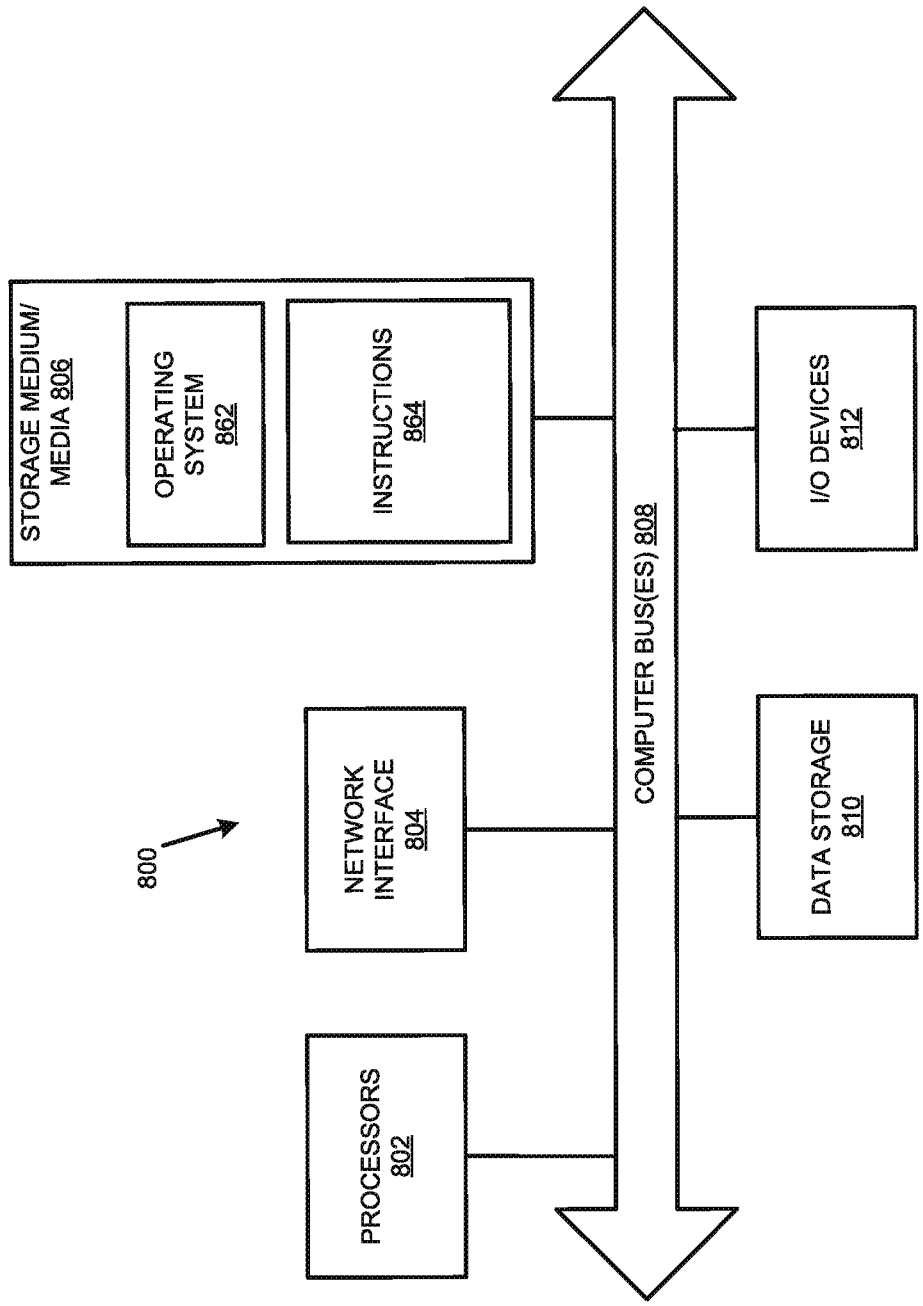
FIG. 8 illustrates a computer system that may be used to implement the automated application testing system in accordance with the examples disclosed herein.

FIG. 8 illustrates a computer system 800 that may be used to implement the automated application testing system 100 in accordance with the examples disclosed herein. More particularly, computing machines such as desktops, laptops, smartphones, tablets, and wearables which may be used to generate or access the data from the automated application testing system 100 may have the structure of the computer system 800. The computer system 800 may include additional components not shown and some of the process components described may be removed and/or modified. In another example, a computer system 800 can sit on external-cloud platforms such as Amazon Web Services, AZURE® cloud or internal corporate cloud computing clusters, or organizational computing resources, etc.

The computer system 800 includes processor(s) 802, such as a central processing unit, ASIC or another type of processing circuit, input/output (I/O) devices 812, such as a display, mouse keyboard, etc., a network interface 804, such as a Local Area Network (LAN), a wireless 802.11x LAN, a 3G, 4G or 5G mobile WAN or a WiMax WAN, and a processor-readable medium 806. Each of these components may be operatively coupled to a bus 808. The processor-readable or computer-readable medium 806 may be any suitable medium that participates in providing instructions to the processor(s) 802 for execution. For example, the processor-readable medium 806 may be a non-transitory or non-volatile medium, such as a magnetic disk or solid-state non-volatile memory, or a volatile medium such as RAM. The instructions or modules stored on the processor-readable medium 806 may include machine-readable instructions 864 executed by the processor(s) 802 that cause the processor(s) 802 to perform the methods and functions of the automated application testing system 100.

The automated application testing system 100 may be implemented as software or machine-readable instructions stored on a non-transitory processor-readable medium and executed by one or more processors 802. For example, the processor-readable medium 806 may store an operating system 862, such as MAC OS, MS WINDOWS, UNIX, or LINUX, and code/instructions 864 for the automated application testing system 100. The operating system 862 may be multi-user, multiprocessing, multitasking, multithreading, real-time, and the like. For example, during runtime, the operating system 862 is running and the code for the Automated application testing system 100 is executed by the processor(s) 802.

The computer system 800 may include a data storage 810, which may include non-volatile data storage. The data storage 810 stores any data used by the automated application testing system 100. The data storage 810 may be used as a local data storage of any of the application execution system 110, application tester 106, and the configuration provider 108 to store the user interaction data, settings, and other data elements which are generated and/or used during the operation of the automated application testing system 100.

The network interface 804 connects the computer system 800 to internal systems for example, via a LAN. Also, the network interface 804 may connect the computer system 800 to the Internet. For example, the computer system 800 may connect to web browsers and other external applications and systems via the network interface 804.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A self-learning automated application testing system, comprising:
   at least one application processor;
   a non-transitory processor-readable medium storing machine-readable instructions that cause the application processor to:
      execute an application including a test script generation module, and
      execute a test script generation process by the test script generation module simultaneously with the application, wherein the test script generation process includes:
         subscribing to access event data of the application, wherein the event data includes at least data related to events fired by the application in response to user interactions that occur during the execution of the application;
         extracting application data including at least user inputs, application flow, and results generated in response to the user inputs by parsing the event data;
         programmatically generating at least one test script by combining the application data along with an expected result of the user interactions;
         comparing the at least one test script with prior recorded test scripts of the application in a test script repository;
         determining that the at least one test script is not included in the prior recorded test scripts in the test script repository; and
         storing the at least one test script as a new test script in the test script repository.

2. The self-learning automated application testing system of claim 1, wherein the test script generation module is encoded in a programming language used for the application.

3. The self-learning automated application testing system of claim 1, wherein executing the test script generation process further causes the application processor to:
   execute the test script generation process asynchronously in a process thread that is separate from a process thread of the application.

4. The self-learning automated application testing system of claim 1, wherein generating the at least one test script further causes the application processor to:
   formatting the application data into the at least one test script corresponding to a regression test.

5. The self-learning automated application testing system of claim 1, wherein the application is a web application and the test script generation module is a plug-in to the web application.

6. The self-learning automated application testing system of claim 5, wherein to generate the at least one test script the application processor to further:
   access configuration parameters of the test script generation process.

7. The self-learning automated application testing system of claim 6, wherein the application processor is to further:
   identify elements of the web application that produce the expected result based on the configuration parameters.

8. The self-learning automated application testing system of claim 1 further comprises:
   at least one testing processor;

a non-transitory processor-readable medium storing machine-readable instructions that cause the testing processor to:
retrieve test execution configuration settings from a configuration repository; and
halt the test script generation process based on a user input after the generation of the new test script.

9. The self-learning automated application testing system of claim 8, further comprising:
execute at least one regression test of the application in accordance with the new test script based on the test execution configuration settings.

10. The self-learning automated application testing system of claim 9, wherein the testing processor is to further:
identify a test results repository based on the test execution configuration settings; and
store results of the at least one regression test in a test results repository.

11. The self-learning automated application testing system of claim 1, further comprising:
a configuration processor; and
a non-transitory processor-readable medium storing machine-readable instructions that cause the configuration processor to:
generate a dashboard that displays results of at least one regression test executed in accordance with the new test script.

12. The self-learning automated application testing system of claim 11, wherein the configuration processor is to further:
enable, via the dashboard, adjustment of test execution configuration settings.

13. A method of testing an application comprising:
executing the application,
wherein the execution of the application includes:
switching on test script generation process based on test configuration parameters,
wherein the test script generation process includes:
receiving event data emitted by the application during the execution of the application;
extracting application data from the event data wherein the application data includes user input, flow of the application during the execution of the application, and results generated in response to the user input;
generating at least one test script by formatting the application data and including an expected result of the user interactions with the formatted application data;
comparing the at least one test script with prior recorded test scripts of the application in a test script repository;
determining that the combination of the at least one test script is not included in the prior recorded test scripts in the test script repository;
storing as a new test script the at least one test script;
retrieving test execution configuration settings from a configuration repository;
halting the test script generation process after the generation of the new test script; and
executing at least one regression test on the application in accordance with the new test script.

14. The method of claim 13, further comprising:
storing test results of the at least one regression test in a test results repository.

15. The method of claim 14, further comprising:
displaying the test results via a dashboard.

16. The method of claim 13, further comprising:
enabling editing of the new test script via a dashboard.

17. The method of claim 13, wherein halting the test script generation process, further comprises:
receiving a user input that stops the test script generation via an interface of the application; and
halting the test script generation process in response to the stop user input.

18. The method of claim 13, wherein executing the application further comprises:
executing processes of the application and the test script generation in different process threads.

19. A non-transitory processor-readable storage medium comprising machine-readable instructions that cause a processor to:
execute an application,
wherein the execution of the application includes:
enabling a test script generation process based on test configuration parameters,
wherein the test script generation process includes:
receiving event data obtained from the application as a result of user interactions with the application during the execution of the application;
extracting application data from the event data wherein the application data includes at least user inputs, application flow, and results generated in response to the user inputs;
generating at least one test script by combining the application data along with an expected result of the user interactions;
comparing the at least one test script with prior recorded test scripts of the application in a test script repository;
determining that the combination of the at least one test script is not included in the prior recorded test scripts in the test script repository;
storing as a new test script the at least one test script;
retrieving test execution configuration settings from a configuration repository;
halting the test script generation process after the generation of the new test script; and
executing at least one regression test on the application in accordance with the new test script.

20. The non-transitory processor-readable storage medium of claim 19, wherein generating the at least one test script includes further instructions that cause the processor to:
configuring parameters for the test script generation process including user interface elements of the application that are to be considered from the expected result.

* * * * *